United States Patent
Gan et al.

(10) Patent No.: US 11,917,565 B2
(45) Date of Patent: *Feb. 27, 2024

(54) CHANNEL ACCESS INDICATION METHOD AND DEVICE USING FIRST AND SECOND SYNCHRONIZATION FRAMES

(71) Applicant: HUAWEI TECHNOLOGIES CO., LTD., Shenzhen (CN)

(72) Inventors: Ming Gan, Shenzhen (CN); Xin Zuo, Shenzhen (CN); Xun Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 219 days.

This patent is subject to a terminal disclaimer.

(21) Appl. No.: 17/529,723

(22) Filed: Nov. 18, 2021

(65) Prior Publication Data

US 2022/0141781 A1 May 5, 2022

Related U.S. Application Data

(63) Continuation of application No. 16/575,539, filed on Sep. 19, 2019, now Pat. No. 11,197,253, which is a
(Continued)

(30) Foreign Application Priority Data

Mar. 23, 2017 (CN) .......................... 201710179619.7

(51) Int. Cl.
*H04L 67/145* (2022.01)
*H04W 56/00* (2009.01)
(Continued)

(52) U.S. Cl.
CPC ........ *H04W 56/001* (2013.01); *H04B 17/255* (2023.05); *H04L 47/806* (2013.01);
(Continued)

(58) Field of Classification Search
CPC . H04W 56/001; H04W 74/00; H04W 74/002; H04W 74/0866; H04W 74/006;
(Continued)

(56) References Cited

U.S. PATENT DOCUMENTS 11,197,253 B2 * 12/2021 Gan .................. H04W 56/0015
2007/0050523 A1 * 3/2007 Emeott ............... H04W 56/001
709/248
(Continued)

FOREIGN PATENT DOCUMENTS

CN 103391364 A 11/2013
CN 104221443 A 12/2014
(Continued)

OTHER PUBLICATIONS

Henrique Devide, IEEE Std 802.11™-2012, "Part 11: Wireless LAN Medium Access Control (MAC) and Physical Layer (PHY) Specifications", IEEE Computer Society, dated Mar. 29, 2012, total 2793 pages.
(Continued)

*Primary Examiner* — Salvador E Rivas
(74) *Attorney, Agent, or Firm* — Maier & Maier, PLLC

(57) ABSTRACT

This application provides a channel access indication method and device. The method includes: receiving, by a first communications device, a channel synchronization request sent by a second communications device, where the channel synchronization request is used to request the first communications device to send a synchronization frame to the second communications device, and a wake-up receiver is configured for the second communications device; and according to the channel synchronization request and a time at which the second communications device is woken up and that is learned by the first communications device based on preset signaling, sending, by the first communications
(Continued)

A first communications device receives a channel synchronization request sent by a second communications device, where the channel synchronization request is used to request the first communications device to send a synchronization frame to the second communications device — S101

According to the channel synchronization request and a time at which the second communications device is woken up and that is learned by the first communications device based on preset signaling, the first communications device sends, when a channel is idle, the synchronization frame to a woken-up second communications device, where the synchronization frame is used to instruct the woken-up second communications device to access the channel after receiving the synchronization frame — S102 device when a channel is idle, the synchronization frame to the woken-up second communications device, where the synchronization frame is used to instruct the woken-up second communications device to access the channel after receiving the synchronization frame.

20 Claims, 4 Drawing Sheets

Related U.S. Application Data continuation of application No. PCT/CN2018/076999, filed on Feb. 23, 2018.

(51) Int. Cl.
*H04W 52/02* (2009.01)
*H04W 72/0446* (2023.01)
*H04L 47/80* (2022.01)
*H04L 49/201* (2022.01)
*H04B 17/20* (2015.01)
*H04H 20/02* (2008.01)
*H04W 52/28* (2009.01)

(52) U.S. Cl.
CPC ......... *H04L 49/201* (2013.01); *H04L 67/145* (2013.01); *H04W 52/0229* (2013.01); *H04W 72/0446* (2013.01); *H04W 74/0808* (2013.01); *H04H 20/02* (2013.01); *H04W 52/0238* (2013.01); *H04W 52/28* (2013.01)

(58) Field of Classification Search
CPC ............. H04W 52/0238; H04W 52/28; H04B 17/255; H04L 67/145
See application file for complete search history.

(56) References Cited

U.S. PATENT DOCUMENTS

| | | | |
|---|---|---|---|
| 2008/0075026 A1 | 3/2008 | Son et al. | |
| 2014/0112226 A1* | 4/2014 | Jafarian | H04W 52/0229 370/311 |
| 2015/0351125 A1 | 12/2015 | Kwon et al. | |
| 2016/0037466 A1* | 2/2016 | Yang | H04W 48/16 370/350 |
| 2016/0073433 A1* | 3/2016 | Kwon | H04W 74/0891 370/338 |
| 2018/0103443 A1* | 4/2018 | Prakash | H04H 20/38 |
| 2019/0191375 A1* | 6/2019 | Cheng | H04L 1/1607 |

FOREIGN PATENT DOCUMENTS

| | | |
|---|---|---|
| CN | 104365164 A | 2/2015 |
| CN | 104737597 A | 6/2015 |
| CN | 104756577 A | 7/2015 |
| CN | 105813077 A | 7/2016 |
| IN | 104756560 A | 7/2015 |
| WO | 2016129824 A1 | 8/2016 |

OTHER PUBLICATIONS

Intel et al., "AP Assisted Medium Synchronization", IEEE 802.11-12/0840r1, Sep. 17, 2012, 16 pages.
Intel et al., "Specification Framework for TGah", IEEE 802.11-11/1137r14, Mar. 20, 2013, 30 pages.

* cited by examiner

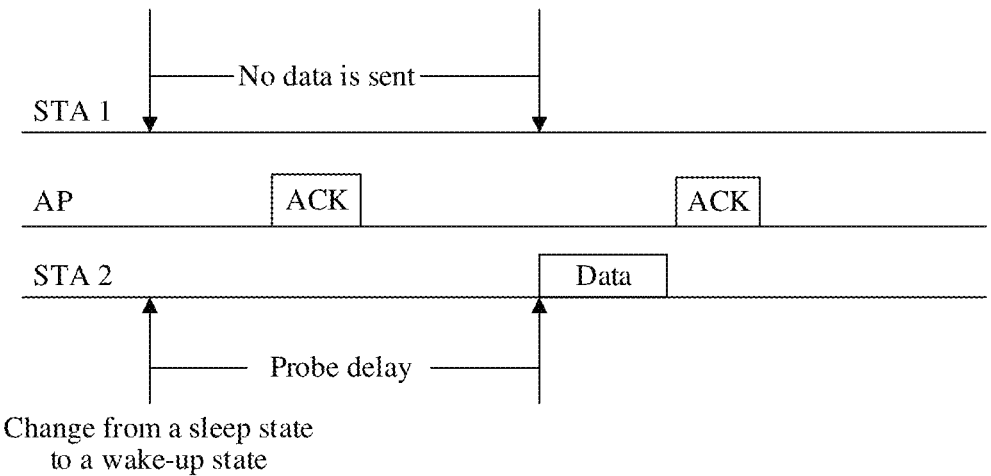

FIG. 4

| A first communications device receives a channel synchronization request sent by a second communications device, where the channel synchronization request is used to request the first communications device to send a synchronization frame to the second communications device | S101 |

| According to the channel synchronization request and a time at which the second communications device is woken up and that is learned by the first communications device based on preset signaling, the first communications device sends, when a channel is idle, the synchronization frame to a woken-up second communications device, where the synchronization frame is used to instruct the woken-up second communications device to access the channel after receiving the synchronization frame | S102 |

FIG. 5

CHANNEL ACCESS INDICATION METHOD AND DEVICE USING FIRST AND SECOND SYNCHRONIZATION FRAMES

CROSS-REFERENCE TO RELATED APPLICATIONS

This application is a continuation of U.S. patent application Ser. No. 16/575,539, filed on Sep. 19, 2019, which is a continuation of International Application No. PCT/CN2018/076999, filed on Feb. 23, 2018. The International Application claims priority to Chinese Patent Application No. 201710179619.7, filed on Mar. 23, 2017. All of the aforementioned patent applications are hereby incorporated by reference in their entireties.

TECHNICAL FIELD

This application relates to communications technologies, and in particular, to a channel access indication method and device.

BACKGROUND

In a wireless fidelity (Wireless-Fidelity, WiFi for short) network, a receive end device wastes a considerable part of energy in listening when no signal is to be received (idle listening). In other words, if a station (Station, STA for short) continuously listens on a channel when no message is to be sent or received, a large amount of energy is to be consumed. Therefore, a sleep mechanism (Sleep mechanism) is introduced in a communications standard, so that the STA can enter a deep sleep (Deep Sleep) state when no data is to be sent or received, to reduce energy consumption caused by continuous listening. However, when the STA is in deep sleep, an access point (Access Point, AP for short) cannot communicate with the STA, and transmission between the access point and the STA can be performed only after the STA wakes up. This may cause a latency (latency). To avoid a high latency caused by the sleep mechanism, the STA usually wakes up periodically according to a sleep policy to check whether there is data to be received, but this reduces sleep efficiency of the STA.

Therefore, in addition to optimizing the sleep policy, another technical approach to reduce energy wasted by the device in idle listening is to use a WUR. A core idea of the technical approach is as follows: In addition to a legacy 802.11 main transceiver module, a low power wake-up receiver (Wake-up Receiver, WUR for short) part is newly added to the receive end device. The legacy 802.11 transceiver module is an 802.11 main radio (Main Radio, MR for short) or main transceiver, as shown in FIG. 1. After the 802.11 MR enters deep sleep, the low power WUR wakes up and starts to work. If the AP needs to communicate with a STA that has a WUR and an 802.11 MR, the AP first sends a wake-up frame (also called Wake Up Packet, WUP for short) to the WUR; the WUR wakes up the 802.11 MR of the STA after correctly receiving the WUP sent to the WUR; and then the AP communicates with the 802.11 MR that wakes up. After completing communication with the AP, the 802.11 MR goes to sleep again. At the same time, the WUR starts to detect again whether there is a WUP to be sent to the WUR, to wake up the 802.11 MR again. In this technology, the low power WUR instead of the 802.11 MR is used to listen on a channel when a medium is idle, thereby effectively reducing energy wasted when the device performs listening.

The MR of the station equipped with the wake-up receiver belongs to a legacy 802.11 device, and usually needs to satisfy an energy-saving mechanism specified in the 802.11 protocol. One stipulation is that, when waking up, the MR of the station needs to wait for a probe delay (probe delay) time or listen to a frame carrying a field used to update a network allocation vector (Network allocation vector, NAV) of a non-target station, and then the MR of the station can start to perform clear channel assessment (Clear Channel Assessment, CCA), and actively preempt a channel (in other words, access the channel) to send a data packet to the AP. Therefore, when waking up, the MR of the station does not directly preempt a channel to send data, so that a collision with ongoing communication between a hidden node and the AP is avoided.

However, after waking up, the MR of the station waits an excessively long probe delay time to access the channel. As a result, power consumption of the station is relatively large.

SUMMARY

This application provides a channel access indication method and device, to resolve a technical problem in the prior art that power consumption of a station is relatively large because after waking up, an MR of the station waits an excessively long probe delay time to access a channel.

According to a first aspect, this application provides a channel access indication method, including:

receiving, by a first communications device, a channel synchronization request sent by a second communications device, where the channel synchronization request is used to request the first communications device to send a synchronization frame to the second communications device, and a wake-up receiver is configured for the second communications device; and according to the channel synchronization request and a time at which the second communications device is woken up and that is learned by the first communications device based on preset signaling, sending, by the first communications device when a channel is idle, the synchronization frame to the woken-up second communications device, where the synchronization frame is used to instruct the woken-up second communications device to access the channel after receiving the synchronization frame.

According to the channel access indication method provided in the first aspect, the second communications device sends the channel synchronization request to the first communications device, to request the first communications device to assist the second communications device in quickly accessing the channel Therefore, after receiving the channel synchronization request and determining, based on the learned time at which the second communications device is woken up, that the second communications device has woken up and that the channel is idle, the first communications device sends the synchronization frame to the second communications device, to trigger the second communications device to access the channel without waiting for a probe delay time. This greatly shortens a waiting time of an MR of the second communications device, and reduces power consumption overheads of the second communications device caused by waiting.

In a possible design, there are a plurality of woken-up second communications devices, and the sending, when a channel is idle, the synchronization frame to the woken-up second communications device specifically includes:

sending, by the first communications device when the channel is idle, a first synchronization frame to any one of the plurality of woken-up second communications devices, where the first synchronization frame carries an identifier of the any one woken-up second communications device; and the first synchronization frame is used to instruct the any one woken-up second communications device to wait first preset duration to access the channel after receiving the first synchronization frame. Optionally, the first synchronization frame is any one of a clear-to-send CTS frame, a request-to-send RTS frame, or a trigger frame.

In a possible design, there are a plurality of woken-up second communications devices, and the sending, when a channel is idle, the synchronization frame to the woken-up second communications device specifically includes:

sending, by the first communications device when the channel is idle, a second synchronization frame to the plurality of woken-up second communications devices, where the second synchronization frame is used to instruct each woken-up second communications device to wait second preset duration to perform a backoff procedure to contend for access to the channel after receiving the second synchronization frame; and a receiver address of the second synchronization frame is a broadcast address. The receiver address of the second synchronization frame is the broadcast address. Optionally, the second synchronization frame is any one of a CTS frame, an RTS frame, or a CF-end frame.

With reference to the foregoing two possible designs, the CTS frame may carry second indication information; and the second indication information is used to indicate, to the woken-up second communications device, that the CTS frame is a synchronization frame.

In a possible design, there are a plurality of woken-up second communications devices, and the sending, when a channel is idle, the synchronization frame to the woken-up second communications device specifically includes:

sending, by the first communications device when the channel is idle, a third synchronization frame to the plurality of woken-up second communications devices, where the third synchronization frame carries a sub-channel resource indication of each woken-up second communications device and an identifier of each woken-up second communications device; a receiver address of the third synchronization frame is a broadcast address; and the third synchronization frame is used to instruct the plurality of woken-up second communications devices to wait first preset duration to simultaneously access the channel based on their respective sub-channel resource indications after receiving the third synchronization frame. Optionally, the third synchronization frame is any one of a multi-user CTS frame, a multi-user RTS frame, or a trigger frame.

In a possible design, there are a plurality of woken-up second communications devices, and the sending, when a channel is idle, the synchronization frame to the woken-up second communications device specifically includes:

sending, by the first communications device when the channel is idle, a physical layer legacy preamble L-Preamble to the plurality of woken-up second communications devices, where the L-Preamble carries first indication information and all or a portion bits of a check code field of a wake-up frame that is received by wake-up receivers of the plurality of woken-up second communications devices to wake up main transceivers of the plurality of second communications devices; the first indication information is used to indicate, to the plurality of woken-up second communications devices, that the L-Preamble is a synchronization frame; the all or the portion bits of the check code field are used to indicate identifiers of the plurality of woken-up second communications devices; and the L-Preamble is used to instruct the plurality of woken-up second communications devices to wait second preset duration to perform a backoff procedure to contend for access to the channel after receiving the L-Preamble.

In a possible design, if there is one woken-up second communications device, the synchronization frame is a physical layer legacy preamble L-Preamble, where the L-Preamble carries first indication information and all or a portion bits of a check code field of a wake-up frame received by a wake-up receiver of the woken-up second communications device; the first indication information is used to indicate, to the second communications device, that the L-Preamble is a synchronization frame; and the all or the portion bits of the check code field are used to indicate an identifier of the woken-up second communications device.

Optionally, if there is one woken-up second communications device, the synchronization frame is any one of a clear-to-send CTS frame, a request-to-send RTS frame, or a trigger frame; and the synchronization frame carries an identifier of the woken-up second communications device.

In a possible design, the receiving, by a first communications device, a channel synchronization request sent by a second communications device specifically includes:

receiving, by the first communications device, an association request frame sent by the second communications device, where the association request frame carries indication information of the channel synchronization request of the second communications device.

In a possible design, the receiving, by a first communications device, a channel synchronization request sent by a second communications device specifically includes:

receiving, by the first communications device, a management frame or a control frame sent by the second communications device, where the management frame or the control frame carries indication information of the channel synchronization request.

In conclusion, regardless of a single-device wake-up scenario or a multi-device wake-up scenario, provided that the second communications device sends the channel synchronization request to the first communications device before the second communications device goes to sleep, the first communications device sends, when the channel is idle and with reference to the time at which the second communications device is woken up and that is learned by the first communications device, the synchronization frame to the woken-up second communications device to trigger the woken-up second communications device to access the channel without waiting for the probe delay time, thereby reducing the waiting time of the MR of the woken-up second communications device, and reducing power consumption of the second communications device. In addition, the first communications device sends the first synchronization frame to any one of the plurality of woken-up second communications devices, to trigger the plurality of second communications devices to access the channel without waiting for the probe delay time. This greatly reduces a transmission time of the synchronization frame, and also ensures that the plurality of woken-up second communications devices can quickly access the channel.

According to a second aspect, to implement the channel access indication method in the first aspect, an embodiment of this application provides a channel access indication device. The device may be the foregoing first communications device, and the first communications device may be a station or an AP. The device has a function of implementing the foregoing channel access indication method. The function may be implemented by hardware, or may be implemented by hardware executing corresponding software. The hardware or the software includes one or more modules corresponding to the foregoing function.

In a possible implementation of the second aspect, the channel access indication device includes a plurality of function modules or units, configured to implement any channel access indication method in the first aspect.

In another possible implementation of the second aspect, a structure of the channel access indication device may include a processor, a receiver, and a transmitter (or a transceiver). The processor is configured to support the device in performing a corresponding function in any channel access indication method in the first aspect. The transceiver is configured to support communication between the device and another network device or terminal device. For example, the transceiver may be a corresponding radio frequency module or baseband module. The device may further include a memory. The memory is configured to be coupled to the processor, and stores a program instruction and data that are necessary for the channel access indication device to perform the channel access indication method.

According to a third aspect, an embodiment of this application provides a computer storage medium, configured to store computer software instructions used by the foregoing channel access indication device, where the computer software instructions include a program designed to execute the first aspect.

According to a fourth aspect, an embodiment of this application provides a computer program product, where the computer program product includes an instruction, and when the computer program is executed by a computer, the instruction enables the computer to perform a function performed by the first communications device in the foregoing method.

Compared with the prior art, according to the channel access indication method and device provided in this application, the second communications device sends the channel synchronization request to the first communications device, to request the first communications device to assist the second communications device in quickly accessing the channel. Therefore, after receiving the channel synchronization request and determining, based on the learned time at which the second communications device is woken up, that the second communications device has woken up and that the channel is idle, the first communications device sends the synchronization frame to the second communications device, to trigger the second communications device to access the channel without waiting for the probe delay time. This greatly shortens the waiting time of the MR of the second communications device, and reduces the power consumption overheads of the second communications device caused by waiting.

BRIEF DESCRIPTION OF DRAWINGS

FIG. 4 is a schematic diagram of channel access when a hidden station does not send data according to this application;

FIG. 5 is a schematic flowchart of an embodiment of a channel access indication method according to this application;

DESCRIPTION OF EMBODIMENTS

This application may be applied to a wireless local area network (Wireless Local Area Network, WLAN for short). Currently, standards used by the WLAN are the Institute of Electrical and Electronics Engineers (Institute of Electrical and Electronics Engineers, IEEE for short) 802.11 family. A station (Station, STA for short) and an access point (Access Point, AP for short) are basic components of the WLAN.

The AP is an access point used by a mobile user to access a wired network, and is mainly deployed within a home, a building, and a campus, with a typical coverage radius of a few dozen meters to a few hundred meters. Certainly, the AP may also be deployed outdoors. The AP is equivalent to a bridge that connects a wired network and a wireless network. A main function of the AP is to connect wireless network clients together, and then connect the wireless network to the Ethernet. Specifically, the AP may be a terminal device or a network device with a WiFi (English: Wireless Fidelity) chip. Optionally, the AP may be a device that supports the 802.11ax standard. Further, optionally, the AP may be a device that supports a plurality of WLAN standards such as 802.11ac, 802.11n, 802.11g, 802.11b, and 802.11a. In the embodiments, a type of a standard supported by the AP is not limited.

The STA is generally a client device in the WLAN. The STA may be mobile or fixed, and is a most basic component of the wireless local area network. The STA may be a wireless communications chip, a wireless sensor, or a wireless communications terminal, for example, a mobile phone supporting a WiFi communication function, a tablet computer supporting a WiFi communication function, a set-top box supporting a WiFi communication function, a smart television supporting a WiFi communication function, a smart wearable device supporting a WiFi communication function, a vehicle-mounted communications device supporting a WiFi communication function, and a computer supporting a WiFi communication function.

Figure 2:
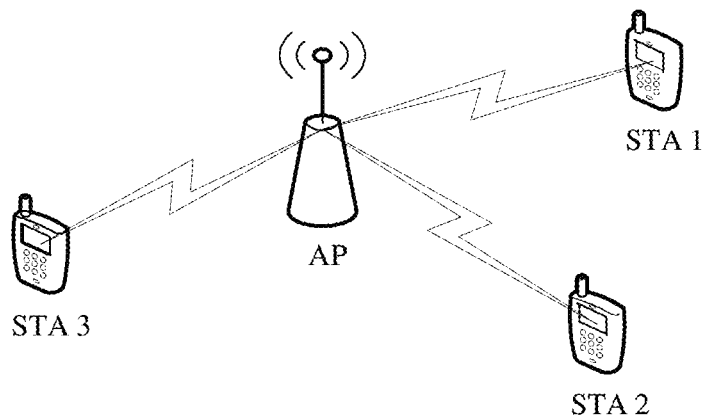
FIG. 2 is a schematic structural diagram of a WLAN system according to this application.

FIG. 2 is a schematic structural diagram of a WLAN system according to this application. As shown in FIG. 2, one AP in the WLAN system may exchange information with a plurality of STAs (for example, three STAs in the figure), including a STA 1, a STA 2, and a STA 3. Certainly, this is not limited thereto. Alternatively, one AP may exchange information with one or more STA groups, and the plurality of STAs may also interact with each other.

Figure 1:
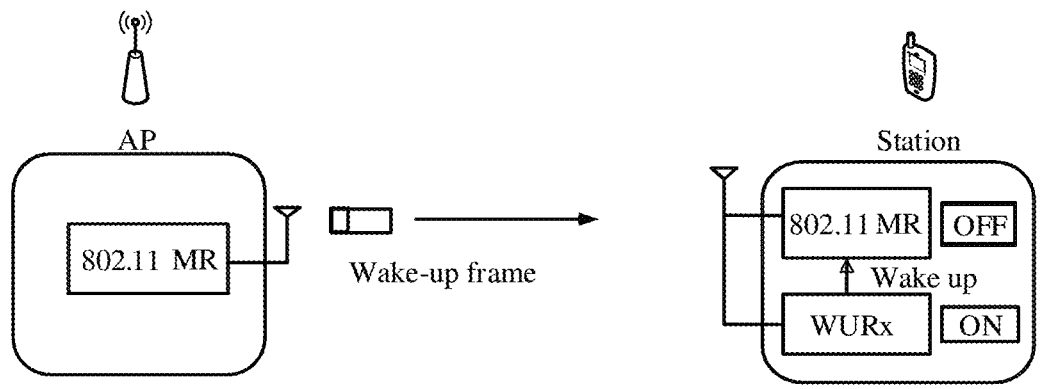
FIG. 1 is a schematic structural diagram of a station equipped with a wake-up receiver according to this application.

It should be noted that an 802.11 main radio MR (or a main transceiver) and a wake-up receiver WUR may be configured for both a first communications device and a second communications device in this application; or a main transceiver may be configured for a first communications device, and a main transceiver and a wake-up receiver may be configured for a second communications device. For the first communications device and the second communications device, refer to the structure shown in FIG. 1. In this application, the first communications device may be an AP or a STA, and the second communications device may be a STA or an AP. When the first communications device is an AP, the second communications device is a STA; or when the first communications device is a STA, the second communications device is an AP. The following embodiments are all described by using an example in which the first communications device is an AP, and the second communications device is a STA.

Generally, wake-up of an MR includes active wake-up and passive wake-up. In this application, the passive wake-up of the MR is discussed, and a process of the passive wake-up may be specifically as follows: An AP sends a wake-up frame (Wake Up Packet, WUP for short) to at least one station STA associated with the AP, where the WUP may be used to indicate reception parameters of an MR of the at least one station after the MR is woken up from a sleep state, for example, a receive mode indication and an indication of a time at which the MR is woken up. A WUR wakes up the MR of the station after receiving the wake-up frame (WUP) sent by the AP. After the MR of the STA is woken up, the MR sends a PS-Poll frame or an acknowledgment frame to the AP to notify the AP that the MR is woken up. Then, the AP returns an acknowledgment (ACK) response, or directly transmits data to the MR of the station. Optionally, the AP may directly send a data frame to the MR of the station after the MR of the station is woken up, without waiting for the MR of the station to send a PS-Poll frame; or the AP may send a request-to-send (request to send, RTS) frame to the MR of a woken-up station, and then the MR of the station sends a clear-to-send (clear to send, CTS) frame to the AP. In addition, the AP may send a WUP to a non-AP station (non-AP STA), or a non-AP STA may send a WUP to the AP. This is not limited in this application.

Figure 3:
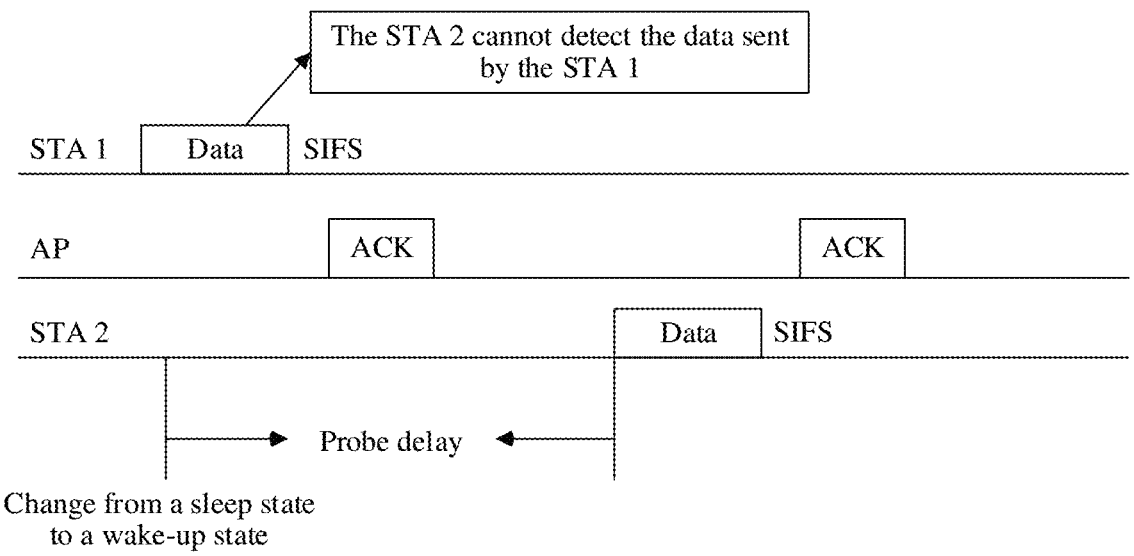
FIG. 3 is a schematic diagram of channel access when a hidden station sends data according to this application.

The MR of the station equipped with the wake-up receiver belongs to a legacy 802.11 device, and usually needs to satisfy an energy-saving mechanism specified in the 802.11 protocol. One stipulation is that, when waking up, the MR of the station needs to wait for a probe delay (probe delay) time or listen to a frame carrying a field used to update a network allocation vector (Network allocation vector, NAV) of a non-target station, and then the MR of the station can start to perform clear channel assessment (Clear Channel Assessment, CCA), and actively preempt a channel (in other words, access the channel) to send a data packet to the AP. Therefore, when waking up, the MR of the station does not directly preempt a channel to send data, so that a collision with ongoing communication between a hidden node and the AP is avoided. For example, as shown in FIG. 3, a station 1 and a station 2 are mutually hidden nodes. To be specific, the station 1 and the station 2 cannot detect a data packet sent by each other. If an MR of the station 2 sends data to an AP within a probe delay when waking up, sending of the data by the station 2 interferes with receiving of data of the station 1 by the AP. If the station 1 and the station 2 are not mutually hidden nodes, and the MR of the station 2 detects that the station 1 is sending data, the MR of the station 2 does not preempt a channel to send data, and the collision mentioned above does not occur. Therefore, in this case, to avoid a collision between sending of data by a station after the station wakes up and communication of a hidden node, it is stipulated in this mechanism that the station needs to wait for a probe delay time when waking up (FIG. 3 shows a case in which after waking up, the station 2 waits a probe delay time to send data, to avoid a collision with sending of the data by the station 1). The time is equal to a sum of a longest physical layer convergence procedure protocol data unit (Physical Layer Convergence Procedure Protocol Data Unit, PPDU) transmission time, a short inter-frame space (Short Inter-frame Space, SIFS), and a transmission time of an acknowledgment (Ack) frame.

However, in the foregoing mechanism in which the MR waits after waking up, there is usually a case: When an MR of a station is in a waiting state after waking up, another hidden station actually does not perform data transmission with the AP. As shown in FIG. 4, a hidden station (namely, a station 1) of a station 2 is not sending data. In this case, a waiting process of the station 2 undoubtedly wastes a great amount of energy of the station 2, and power consumption of the station 2 is relatively large. For a station equipped with a button cell (for example, a sensor equipped with a button cell), the station has an extremely strict requirement for power consumption, and the button cell is expected to work for more than one year. If an MR of a station of this type still blindly waits for a probe delay time after waking up, and then preempts a channel to send data, a quantity of electricity of the station is consumed. This is extremely not conducive to energy conservation.

Therefore, a channel access indication method and device provided in this application are intended to resolve a technical problem in the prior art that power consumption of a station is relatively large because after waking up, an MR of the station blindly waits an excessively long probe delay time to access a channel.

It should be understood that, although terms such as "first", "second", and "third" may be used in the embodiments of the present application to describe XXX, the XXX should not be limited to these terms. These terms are merely used to distinguish the XXX from one another. For example, without departing from the scope of the embodiments of the present application, a first XXX may also be referred to as a second XXX, and similarly, a second XXX may also be referred to as a first XXX.

The following describes the technical solutions of this application in detail by using specific embodiments. The following specific embodiments may be combined with each other, and same or similar concepts or processes may not be repeatedly described in some embodiments.

FIG. 5 is a schematic flowchart of an embodiment of a channel access indication method according to this application. This embodiment relates to the following specific process: To shorten a waiting time of a second communications device after the second communications device wakes up, the second communications device sends a channel synchronization request to a first communications device, so that the first communications device can send, with reference to a learned time at which the second communications device is woken up, a synchronization frame to the woken-up second communications device, and then the second communications device can determine, based on the synchronization frame, to access a channel without waiting for a probe delay time. As shown in FIG. 5, the method includes the following steps.

S101. The first communications device receives the channel synchronization request sent by the second communications device, where the channel synchronization request is used to request the first communications device to send the synchronization frame to the second communications device.

A wake-up receiver is configured for the second communications device.

Specifically, to reduce power consumption, the second communications device sends the channel synchronization request to the first communications device before the second communications device goes to sleep, where the channel synchronization request is used to request the first communications device to send the synchronization frame to the second communications device. The first communications device may return a synchronization response frame to the second communications device after receiving the channel synchronization request. It should be noted that, the channel synchronization request may be used to explicitly request the first communications device to send the synchronization frame. For example, the channel synchronization request directly notifies the first communications device that there is a need to obtain the synchronization frame of the first communications device, so that the first communications device can assist the second communications device in quickly accessing the channel after the second communications device is woken up. Optionally, the channel synchronization request may alternatively be used to implicitly request the first communications device to send the synchronization frame. For example, the channel synchronization request may carry power consumption information of the second communications device, to notify the first communications device that the second communications device has a relatively strict requirement for power consumption, and the first communications device is required to send the synchronization frame to assist the second communications device in accessing the channel without waiting for the probe delay time after an MR is woken up. A form of the channel synchronization request is not limited in this application.

Optionally, that the first communications device receives the channel synchronization request sent by the second communications device may include the following several implementations.

In a first implementation, the first communications device receives an association request frame sent by the second communications device, where the association request frame carries indication information of the channel synchronization request of the second communications device.

In this implementation, in a phase in which the second communications device performs association with the first communications device, the second communications device sends the association request frame to the first communications device, to send the channel synchronization request to the first communications device. The association request frame carries the indication information of the channel synchronization request of the second communications device. Optionally, the indication information may be explicit indication information, or may be implicit power consumption information of the second communications device.

In a second implementation, the first communications device receives a management frame or a control frame sent by the second communications device. Optionally, the second communications device may send the management frame or the control frame to the first communications device when a quantity of electricity of the second communications device is less than a preset electricity quantity threshold. The management frame or the control frame carries indication information of the channel synchronization request. Optionally, if the first communications device sends the management frame, the indication information may be a synchronization request element in the management frame. Optionally, the indication information of the channel synchronization request may alternatively be carried in a field in a data frame.

S102. According to the channel synchronization request and a time at which the second communications device is woken up and that is learned by the first communications device based on preset signaling, the first communications device sends, when the channel is idle, the synchronization frame to a woken-up second communications device, where the synchronization frame is used to instruct the woken-up second communications device to access the channel after receiving the synchronization frame.

Specifically, in a phase, an MR of the second communications device enters a sleep state. If the first communications device needs to communicate with the MR of the second communications device, for example, send downlink data to the MR of the second communications device, the first communications device may send a wake-up frame (WUP) to the wake-up receiver (WUR) of the second communications device, to wake up the MR of the second communications device. After receiving the wake-up frame, the wake-up receiver of the second communications device triggers a main transceiver of the second communications device to wake up. Optionally, the wake-up frame may carry a wake-up moment of the wake-up receiver of the second communications device, to instruct the wake-up receiver of the second communications device to wake up at the specified wake-up moment.

In this application, the first communications device may learn, based on the preset signaling, the time at which the second communications device is woken up. Optionally, the preset signaling may be the wake-up frame. When the wake-up frame carries the wake-up moment of the wake-up receiver of the second communications device, the first communications device may learn, based on the wake-up frame sent by the first communications device to the second communications device, the time at which the second communications device is woken up. Optionally, when the wake-up frame does not carry the wake-up moment of the wake-up receiver of the second communications device, the first communications device may estimate, by using a sending moment of the wake-up frame, the time at which the second communications device is woken up. Optionally, the preset signaling may be other information. This is not limited in this embodiment of this application. In other words, the wake-up moment of the second communications device may be a moment specified by the first communications device, or may be an estimated wake-up time. After the first communications device determines, based on the time at which the second communications device is woken up, that the second communications device has woken up (herein, the determined moment at which the second communications device wakes up is not notified by the woken-up second communications device to the first communications device, but is estimated or specified by the first communications device), in a period in which the second communications device is awake, the first communications device detects whether the channel is idle.

When the first communications device detects that the channel is idle, the first communications device sends the synchronization frame to the second communications device that needs to be assisted in quickly accessing the channel. In other words, the first communications device sends the synchronization frame to the second communications device that previously sends the channel synchronization request to the first communications device. After the second communications device receives the synchronization frame, the second communications device may learn a current channel status. Therefore, the second communications device is triggered by the synchronization frame to access the channel. Optionally, a manner of accessing the channel may be that the second communications device sends a wake-up report frame to the first communications device. The wake-up report frame may be an acknowledgment frame or a power save poll (Power save poll, Ps-poll for short) frame, or may be a clear-to-send (Clear To Send, CTS) frame. A type of the wake-up report frame is not limited in this application. After the first communications device receives the wake-up report frame sent by the second communications device, the first communications device may send an acknowledgment frame respond to the second communications device or directly send downlink data to the second communications device.

Figure 6:
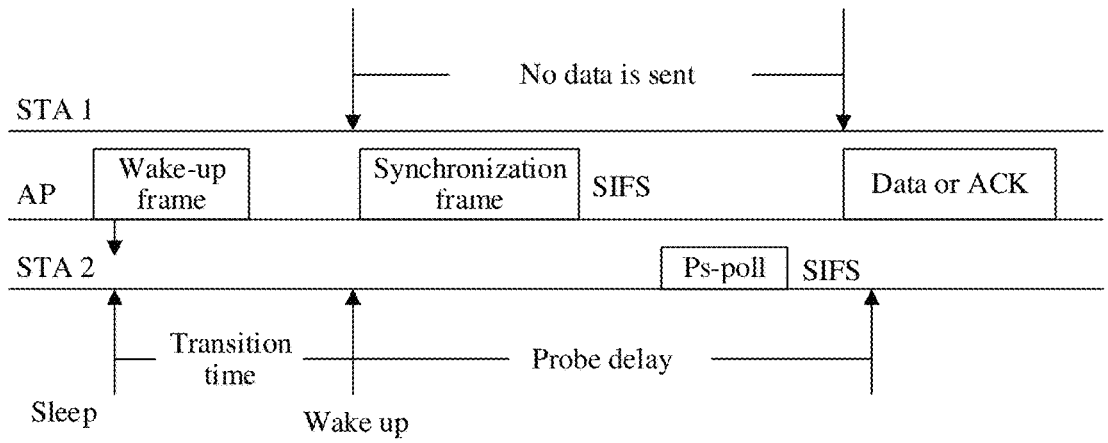
FIG. 6 is a schematic diagram of channel access triggered by a synchronization frame according to this application.

Optionally, in this application, that the second communications device accesses the channel after receiving the synchronization frame may be that the second communications device directly accesses the channel after receiving the synchronization frame, or may be that the second communications device waits preset duration to access the channel after receiving the synchronization frame. The preset duration may be a short inter-frame space (Short inter-frame space, duration for short), or may be a distributed coordination function inter-frame space (Distributed Coordination Function Inter-frame Space, DIFS for short), or certainly may be other duration, provided that the preset duration is less than the probe delay time. For example, as shown in FIG. 6, when an AP learns that a station 2 wakes up, and the AP detects that a channel is idle, the AP may send a synchronization frame to the woken-up station 2. After receiving the synchronization frame, the station 2 waits an SIFS time, and then may immediately respond with a PS-poll frame to notify the AP that the station 2 has woken up. Then, the AP sends an acknowledgment frame or directly sends downlink data to the station 2.

Optionally, in a period in which the first communications device determines, based on the learned time at which the second communications device is woken up, that the second communications device has woken up, if the first communications device detects that the channel is in a busy state, the first communications device does not perform any operation. When the channel is idle, and the first communications device does not yet receive a wake-up report frame of the second communications device, the first communications device continues to send the synchronization frame to the second communications device, to assist the second communications device in quickly accessing the channel.

Optionally, the synchronization frame in this application may be a frame for one woken-up second communications device to quickly access a channel, for example, referring to the example shown in FIG. 6. Alternatively, the synchronization frame may be a frame for a plurality of woken-up second communications devices to quickly access a channel. This is not limited in this embodiment.

Optionally, in this embodiment, based on the time at which the second communications device is woken up and that is learned by the first communications device, the first communications device may also detect, in a period in which the second communications device is awake, whether the channel is idle, and directly send the synchronization frame to the second communications device when detecting that the channel is idle. To be specific, optionally, the second communications device may not need to send the channel synchronization request to the first communications device, or the first communications device does not need to wait until the second communications device sends the channel synchronization request, to send the synchronization frame to the second communications device.

It can be learned from the foregoing description that, in this application, after being woken up, the MR of the second communications device may access the channel, without waiting for the probe delay time after receiving the synchronization frame sent by the first communications device. Therefore, in this application, a waiting time of the MR of the second communications device is greatly shortened, and power consumption overheads of the second communications device caused by waiting are reduced.

According to the channel access indication method provided in this application, the second communications device sends the channel synchronization request to the first communications device, to request the first communications device to assist the second communications device in quickly accessing the channel Therefore, after receiving the channel synchronization request and determining, based on the learned time at which the second communications device is woken up, that the second communications device has woken up and that the channel is idle, the first communications device sends the synchronization frame to the second communications device, to trigger the second communications device to access the channel without waiting for the probe delay time. This greatly shortens the waiting time of the MR of the second communications device, and reduces the power consumption overheads of the second communications device caused by waiting.

With reference to the description of the foregoing embodiment, in the following several possible implementations, specific implementations of the foregoing synchronization frame is described from the perspective of a specific frame structure.

In a first possible implementation of this embodiment of this application, the synchronization frame may be a physical layer legacy preamble (Legacy Preamble, L-Preamble for short) that carries first indication information, and does not carry any payload part. The synchronization frame includes a legacy short training field, a legacy long sequence field, and a legacy signaling field. Reference is made to a physical layer legacy 802.11 preamble shown in Table 1a. If calculation is performed based on a minimum transmission rate that is generated by binary phase shift keying (Binary Phase Shift Keying, BPSK) modulation and a convolutional code with a code rate of 0.5, a transmission time of the L-preamble is 20 µs. The transmission time is far less than the probe delay time. The legacy signaling field in the physical layer legacy preamble includes a 4-bit rate field, a 1-bit reserved field, a 12-bit length field, a 1-bit check code field, and a 6-bit tail field, as shown in Table 1.

TABLE 1

| Rate | Reserved | Length | Check code | Tail |
|------|----------|--------|------------|------|

TABLE 1a

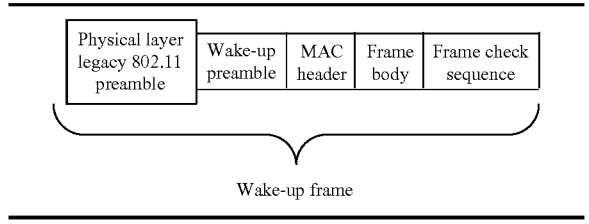

Wake-up frame

TABLE 1b

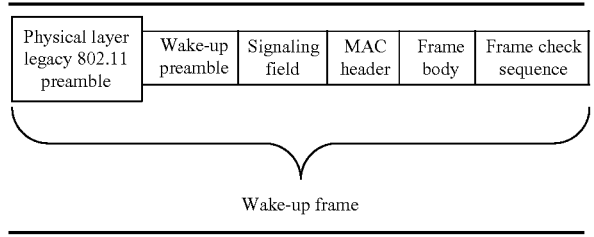

Wake-up frame

The L-Preamble in this implementation carries the first indication information, and the first indication information is used to indicate, to the second communications device, that the L-Preamble is a synchronization frame. In this way, after receiving a physical layer legacy preamble, the second communications device may determine whether the physical layer legacy preamble is a synchronization frame, depending on whether the physical layer legacy preamble carries the first indication information. Optionally, the first indication information may be implemented by using the length field of the physical layer legacy preamble. For example, all 12 bits of the length field are set to zeros. Optionally, the first indication information may alternatively be implemented by using a reserved bit of the physical layer legacy preamble. To be specific, the reserved bit of the physical layer legacy preamble is set to 1, and it may indicate that the physical layer legacy preamble is a synchronization frame. Optionally, the first indication information may alternatively be implemented by using the rate field of the physical layer legacy preamble. Only eight values of the 4-bit rate field are used in a current protocol. For the eight values, refer to the following Table 2. In this implementation, it may be determined, by setting the 4-bit rate field to another value, that the physical layer legacy preamble sent to the second communications device is a synchronization frame. For example, the rate field is set to 1111, and 1111 is the first indication information.

TABLE 2

| Rate field | 1101 | 0111 | 0101 | 0111 | 1001 | 1011 | 0001 | 0011 |
|------------|------|------|------|------|------|------|------|------|
| Rate Mb/s (20 MHz channels) | 6 | 9 | 12 | 18 | 24 | 36 | 48 | 54 |

A physical layer legacy preamble in the current protocol does not carry a receiver address. Therefore, to further determine a second communications device to which the synchronization frame is sent, it is proposed in this implementation that the L-preamble carries indirect address information that can identify the second communications device. The indirect address information may be specifically all or a portion bits of a check code field, carried by a rate field, of a wake-up frame of the second communications device, the all or the portion bits of the check code field. For example, the some bits may be four bits such as four least significant bits in a cyclic redundancy check (Cycle Redundancy Check, CRC for short) code field or a frame check sequence (Frame Check Sequence, short) field. A check code field or an FCS field corresponds to a wake-up frame. Different wake-up frames have different check code fields or frame check sequence fields, and the different wake-up frames are in a one-to-one correspondence with identifiers of different second communications devices. Therefore, different woken-up second communications devices may be distinguished by using different all or a portion bits of the check code fields.

In conclusion, in this implementation, the synchronization frame may be the physical layer legacy preamble, and the physical layer legacy preamble carries the first indication information and all or a portion bits of a check code field of the wake-up frame received by the wake-up receiver of the second communications device. After receiving the physical layer legacy preamble, the second communications device may identify, by using the first indication information, that the physical layer legacy preamble is the synchronization frame sent by the first communications device, and identify, by using the all or the portion bits of the check code field, carried in the physical layer legacy preamble, of the wake-up frame, whether the synchronization frame is the synchronization frame sent to the second communications device the all or the portion bits of the check code field.

Optionally, in an optional manner, the foregoing synchronization frame may alternatively be another special physical layer legacy preamble. The synchronization frame includes a legacy short training field, a legacy long sequence field, a legacy signaling field, and an orthogonal frequency division multiplexing (Orthogonal Frequency Division Multiplexing, OFDM for short) symbol modulated by using binary phase shift keying (Binary Phase Shift Keying, BPSK for short). The OFDM symbol modulated by using BPSK may be a product of a repeated legacy signaling field in the physical layer legacy preamble and a specified random sequence (which is not all ones). For example, the random sequence may be all minus ones. Alternatively, the OFDM symbol modulated by using BPSK may be a new OFDM symbol modulated by using BPS K. The OFDM symbol may carry 24-bit information (the OFDM is modulated by using BPSK and encoded by using a convolutional code with a code rate of 0.5). For example, the OFDM symbol may carry the first indication information and all of a portion bits of a check bit of a wake-up frame. Optionally, for a structure of the synchronization frame, refer to the following Table 2a and Table 2b.

TABLE 2a

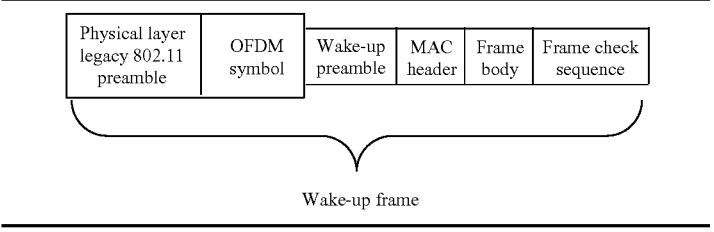

TABLE 2b

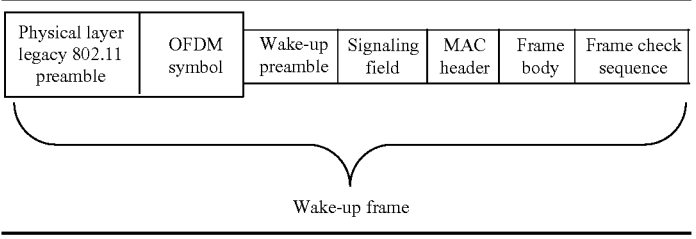

In a second possible implementation of this embodiment of this application, the foregoing synchronization frame may be a CTS frame. For a frame structure of the CTS frame, refer to the following Table 3. If calculation is performed based on a minimum transmission rate, considering that a physical layer preamble of a CTS frame is a physical layer legacy preamble, a transmission time of the CTS frame that is transmitted as the synchronization frame is approximately 40 μs. The transmission time is short, and is less than the probe delay time.

TABLE 3

| Frame control field (2 bytes) | Duration field (2 bytes) | Receiver address field (6 bytes) | Frame check sequence field (4 bytes) |
| --- | --- | --- | --- |

Optionally, the CTS frame may not carry second indication information. Provided that a CTS frame is sent, after the first communications device receives the channel synchronization request of the second communications device, and the MR of the second communications device wakes up, by the first communications device according to the channel synchronization request, the CTS frame is the synchronization frame sent by the first communications device. Optionally, the CTS frame may carry second indication information, and the second indication information is used to explicitly indicate, to the woken-up second communications device, that the CTS frame is a synchronization frame. The second indication information may be indicated by using a field (or a bit) in the CTS frame. For example, the duration field may be set to 0 (which indicates the second indication information), and the woken-up second communications device may identify the CTS frame as a synchronization frame.

In a third possible implementation of this embodiment of this application, the foregoing synchronization frame may be an RTS frame. For a frame structure of the RTS frame, refer to the following Table 4. The RTS frame may carry second indication information used to indicate, to the woken-up second communications device, that the RTS frame is a synchronization frame. For example, the second indication information may be implemented by using a duration field in the following Table 4. When the duration field is set to 0, it represents that a current RTS frame is a synchronization frame. If calculation is performed based on a minimum transmission rate, considering that a physical layer preamble of a RTS frame is a physical layer legacy preamble, a transmission time of the RTS frame is approximately 47 μs. The transmission time is less than the probe delay time.

TABLE 4

| Frame control field (2 bytes) | Duration field (2 bytes) | Receiver address field (6 bytes) | Transmitter address field (6 bytes) | Frame check sequence field (4 bytes) |
| --- | --- | --- | --- | --- |

It should be noted that, in the third possible implementation, an RTS/CTS exchange procedure is used. However, in this case, a condition for using RTS/CTS is no longer that a length of a subsequently transmitted data packet, or time reaches a threshold, but that the main transceiver of the woken-up second communications device sends channel synchronization request information to an AP.

In a fourth possible implementation of this embodiment of this application, the foregoing synchronization frame may be a contention-free end (Contention Free End, CF-end for short) frame. After the MR of the second communications device wakes up, if a CF-end frame sent by the first communications device is received, it is determined that the synchronization frame sent by the first communications device is received. For a frame structure of the CF-end frame, refer to the following Table 5. A BSSID in Table 5 is a basic service set identifier (Basic Service Set Identifier, BSSID for short). If calculation is performed based on a minimum transmission rate, considering that a physical layer preamble of the CF-end frame is a physical layer legacy preamble, a transmission time is approximately 47 μs. The transmission time is less than the probe delay time. A receiver address of the CF-end frame is a broadcast address.

TABLE 5

| Frame control field (2 bytes) | Duration field (2 bytes) | Receiver address field (6 bytes) | BSSID field (6 bytes) | Frame check sequence field (4 bytes) |
| --- | --- | --- | --- | --- |

In a fifth possible implementation of this embodiment of this application, the foregoing synchronization frame may be a trigger frame in the 802.11ax protocol. If calculation is performed based on a minimum transmission rate, considering that a physical layer preamble of the trigger frame is a physical layer legacy preamble, a transmission time is approximately 77 μs. The transmission time is less than the probe delay time. For a frame structure of the trigger frame, refer to the following Table 6.

TABLE 6

| Frame control (2 bytes) | Duration (2 bytes) | Receiver address (6 bytes) | Transmitter address (6 bytes) | Common information (8 bytes or more) | User information (5 bytes or more) | . . . | User information (5 bytes or more) | Padding (Variable) | Frame check sequence (4 bytes) |
|---|---|---|---|---|---|---|---|---|---|

The foregoing several possible implementations describe the specific implementations of the synchronization frame. It should be noted that, the specific implementations of the synchronization frame may change depending on wake-up scenarios, and in different wake-up scenarios, the first communications device may send the synchronization frame in different manners. Actual scenarios of waking up the MR of the second communications device may include single-device wake-up and multi-device wake-up. The single-device wake-up means that the first communications device chooses to wake up an MR of only one second communications device. A wake-up frame sent by the first communications device to a wake-up receiver of the second communications device carries an identifier of only one second communications device. The multi-device wake-up means that a wake-up frame sent by the first communications device is for wake-up receivers of a plurality of second communications devices, and the wake-up frame is a multi-device wake-up frame. The wake-up frame carries identifiers of the plurality of second communications devices. The following describes, with reference to different wake-up scenarios, some changes to the synchronization frame, sending manners of the synchronization frame, and channel access manners corresponding to different sending manners of the synchronization frame.

1. A single-device wake-up scenario: In this scenario, there is one woken-up second communications device. Before an MR of the second communications device goes to sleep, the second communications device sends a channel synchronization request to the first communications device. In a phase, the MR of the second communications device enters a sleep state, and the first communications device sends a wake-up frame to a wake-up receiver of the second communications device, to trigger the MR of the second communications device to wake up. After the first communications device receives the channel synchronization request, and learns that the MR of the second communications device has woken up (as described above, a wake-up moment herein is a time estimated or specified by the first communications device, but not notified by the second communications device), the first communications device sends a synchronization frame to the MR of the single second communications device. The second communications device may access a channel without waiting for a probe delay time after receiving the synchronization frame.

In this scenario, the synchronization frame may be the foregoing L-Preamble that carries first indication information and all or a portion bits of a check code field of the wake-up frame; or the synchronization frame may be the foregoing CTS frame that carries second indication information, where the CTS frame carries an identifier of the woken-up second communications device; or the synchronization frame may be the foregoing RTS frame that carries second indication information, where the RTS frame carries an identifier of the woken-up second communications device; or the synchronization frame may be the foregoing trigger frame, where the trigger frame carries an identifier of the woken-up second communications device. For example, a receiver address of the trigger frame is set to an address of the woken-up second communications device. The trigger frame in Table 5 includes a user information field. The second communications device may wait SIFS duration to respond to the first communications device with an Ack frame after receiving the synchronization frame.

Figure 7:
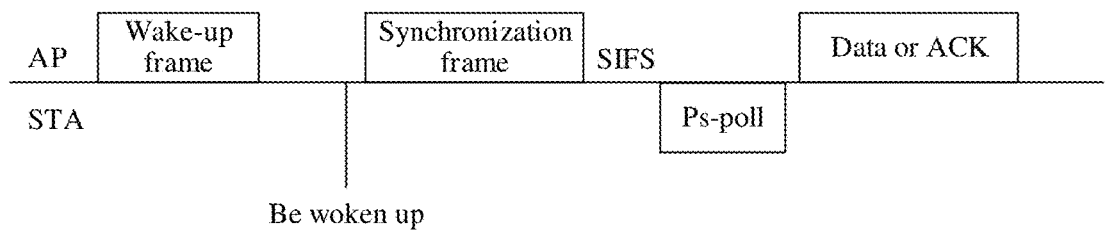
FIG. 7 is a schematic diagram of channel access in a single-device wake-up scenario according to this application.

Optionally, for a schematic diagram of channel access in the single-device wake-up scenario, refer to FIG. 7.

2. A multi-device wake-up scenario: In this scenario, there are a plurality of woken-up second communications devices. Before MRs of the plurality of second communications devices go to sleep, each second communications device sends a channel synchronization request to the first communications device. In a phase, the MRs of the second communications devices enter a sleep state, and the first communications device sends a multi-device wake-up frame to wake-up receivers of the second communications devices, to trigger the MRs of the second communications devices to wake up. The multi-device wake-up frame carries identifiers of the plurality of second communications device. After the first communications device receives the channel synchronization request and learns that the MRs of the second communications devices have woken up (as described above, a wake-up moment herein is a time estimated or specified by the first communications device, but not notified by the second communications device), the first communications device sends a synchronization frame to trigger the MRs of the plurality of second communications devices to access a channel without waiting for a probe delay time.

In this scenario, the first communications device may specifically send, when the channel is idle, the synchronization frame to the second communications devices in the following five sending manners (1), (2), (3), (4), and (5). Specific processes are as follows.

(1) The first communications device sends, when the channel is idle, a first synchronization frame to any one of the plurality of woken-up second communications devices, where the first synchronization frame carries an identifier of the any one woken-up second communications device; and the first synchronization frame is used to instruct the any one woken-up second communications device to wait first preset duration to access the channel after receiving the first synchronization frame.

Specifically, in this implementation, there are the plurality of woken-up second communications devices, and the first communications device may send the first synchronization frame to any one second communications device (it is assumed that the second communications device is a device A) in the plurality of woken-up second communications devices, where the first synchronization frame may carry an identifier of the device A. Optionally, the identifier may be an identifier of a wake-up receiver of the device A, or may be an association identifier of the device A. The first synchronization frame is used to instruct the device A to wait the first preset duration to access the channel after receiving the first synchronization frame sent by the first communications device. Optionally, the first preset duration may be SIFS duration. It should be noted that, in this implementation, the first communications device needs to send the first synchronization frame to only one woken-up second communications device, and does not need to send a corresponding synchronization frame to other second communications devices. In this way, a transmission time of the synchronization frame can be reduced, and the other second communications devices can access the channel without waiting for a probe delay time. A reason is that the first communications device has sent the first synchronization frame to the device A. In this case, the other second communications devices may detect that the frame is being transmitted on the channel. Therefore, the other second communications devices only need to wait until NAVs of the other second communications devices decrease to 0, to preempt the channel to send data. The other second communications devices do not need to wait for the probe delay time (for example, the second communications device is a station, and there are two cases in which the station wakes up from sleep. In one case, an MR of the station wakes up and does not detect that a frame is being transmitted on a channel Therefore, the station needs to wait the probe delay time to preempt the channel to send data. In another case, an MR of the station wakes up and detects that a frame is being transmitted on a channel. In this case, the station only needs to wait until a NAV of the station decreases to 0, to access the channel). In addition, the first communications device does not need to send another synchronization frame. Therefore, this reduces the transmission time of the synchronization frame, and also ensures that the other second communications devices can quickly access the channel.

Optionally, the first synchronization frame may be any one of the CTS frame, the RTS frame, and the trigger frame. The CTS frame, the RTS frame, and the trigger frame each may carry the identifier of the any one woken-up second communications device. For example, a receiver address of the trigger frame is set to an address of the woken-up second communications device. The trigger frame in Table 5 includes a user information field. It should be noted that the identifier of the second communications device that is carried in each of the CTS frame, the RTS frame, and the trigger frame is an explicit identifier of the second communications device, for example, an identifier or an association identifier of the wake-up receiver of the second communications device. In other words, the identifier of the second communications device can explicitly indicate the second communications device that accesses the channel, to accelerate assistance in channel synchronization.

(2) The first communications device sends, when the channel is idle, a second synchronization frame to the plurality of woken-up second communications devices, where the second synchronization frame is used to instruct each woken-up second communications device to wait second preset duration to perform a backoff procedure to contend for access to the channel after receiving the second synchronization frame; and a receiver address of the second synchronization frame is a broadcast address.

Specifically, in this implementation, there are the plurality of woken-up second communications devices, and the first communications device sends the second synchronization frame to the plurality of woken-up second communications devices, where the receiver address of the second synchronization frame is the broadcast address. Therefore, each woken-up second communications device may receive the second synchronization frame, and wait the second preset duration (the channel is idle in the second preset duration) to perform the backoff procedure to contend for access to the channel after receiving the second synchronization frame. The second preset duration may be DIFS, or certainly, the second preset duration may be other duration. It should be noted that the second synchronization frame does not carry an identifier of each woken-up second communications device.

Optionally, the second synchronization frame may be any one of the CTS frame, the RTS frame, and the CF-end frame. A difference between the CTS frame and the RTS frame in the single-device wake-up, and the CTS frame and the RTS frame is that receiver addresses of the CTS frame and the RTS frame each are a broadcast address. A receiver address of the CF-end frame is also a broadcast address.

(3) The first communications device sends, when the channel is idle, a third synchronization frame to the plurality of woken-up second communications devices, where the third synchronization frame carries a sub-channel resource indication of each woken-up second communications device and an identifier of each woken-up second communications device; a receiver address of the third synchronization frame is a broadcast address; and the third synchronization frame is used to instruct the plurality of woken-up second communications devices to wait first preset duration to simultaneously access the channel based on their respective sub-channel resource indications after receiving the third synchronization frame.

Specifically, in this implementation, there are the plurality of woken-up second communications devices, and the first communications device sends the third synchronization frame to the plurality of woken-up second communications devices, where the receiver address of the third synchronization frame is the broadcast address. Therefore, each woken-up second communications device may receive the third synchronization frame. In addition, the third synchronization frame carries the sub-channel resource indication of each woken-up second communications device and the identifier of each woken-up second communications device. Therefore, each woken-up second communications device accesses, with reference to the sub-channel resource indication corresponding to each woken-up second communications device in the third synchronization frame, the channel on a corresponding sub-channel resource after receiving the third synchronization frame. To be specific, in this implementation, the plurality of woken-up second communications devices may wait the first preset duration to simultaneously perform uplink multiplexing transmission such as orthogonal frequency division multiple access (Orthogonal Frequency Duplex Multiple Access, OFDMA for short) transmission or multi-user multiple-input multiple-output (Multiple Users Multiple Input Multiple Output, MU-MIMO for short) transmission to simultaneously access the channel after receiving the third synchronization frame. The first preset duration herein may be an SIFS time, or may be other duration less than the probe delay time.

Optionally, the third synchronization frame may be a multi-user CTS frame, a multi-user RTS frame, or a trigger frame. A difference from the CTS frame, the RTS frame, or the trigger frame in (1) and (2) is that receiver addresses of the multi-user CTS frame, the multi-user RTS frame, and the trigger frame each are a broadcast address. In addition, the multi-user CTS frame, the multi-user RTS frame, and the trigger frame each carry the identifier of each woken-up second communications device and the sub-channel resource indication of each woken-up second communications device. The trigger frame is used as an example. With reference to the structure of the trigger frame in Table 5, the trigger frame includes a plurality of user information fields, and the plurality of woken-up second communications devices simultaneously transmit wake-up report frames by using OFDMA or Mu-MIMO based on sub-channel resource indications in the trigger frame.

In this implementation, the plurality of woken-up second communications devices may be simultaneously scheduled by using the third synchronization frame, thereby improving channel access efficiency of the plurality of woken-up second communications devices.

(4) The first communications device sends, when the channel is idle, an L-Preamble to the plurality of woken-up second communications devices, where the L-Preamble carries first indication information and all or a portion bits of a check code field of a wake-up frame that is received by the wake-up receivers of the plurality of woken-up second communications devices to wake up main transceivers of the plurality of second communications devices; the first indication information is used to indicate, to the plurality of woken-up second communications devices, that the L-Preamble is a synchronization frame; the all or the portion bits of the check code field are used to indicate identifiers of the plurality of woken-up second communications devices; and the L-Preamble is used to instruct the plurality of woken-up second communications devices to wait second preset duration to perform a backoff procedure to contend for access to the channel after receiving the L-Preamble.

Specifically, in this implementation, the synchronization frame is the L-Preamble that carries the first indication information and the all or the portion bits of the check code field of the wake-up frame. The wake-up frame herein is a wake-up frame used to wake up the main transceivers of the plurality of second communications devices. The first indication information is used to indicate, to the plurality of woken-up second communications devices, that the L-Preamble is a synchronization frame, and the all or the portion bits of the check code field of the wake-up frame are used to indicate the identifiers of the plurality of woken-up second communications devices. When the first communications device sends the L-Preamble, that is, sends the L-Preamble to the plurality of woken-up second communications devices, the plurality of woken-up second communications devices wait the second preset duration to perform the backoff procedure to contend for access to the channel after receiving the L-Preamble. The second preset duration may be DIFSDIFS, or certainly, the second preset duration may be other duration. If the channel is idle within the second preset duration, the plurality of woken-up second communications devices perform the backoff procedure to contend for access to the channel. For example, the plurality of woken-up second communications devices send wake-up report frames to the first communications device.

Figure 8:
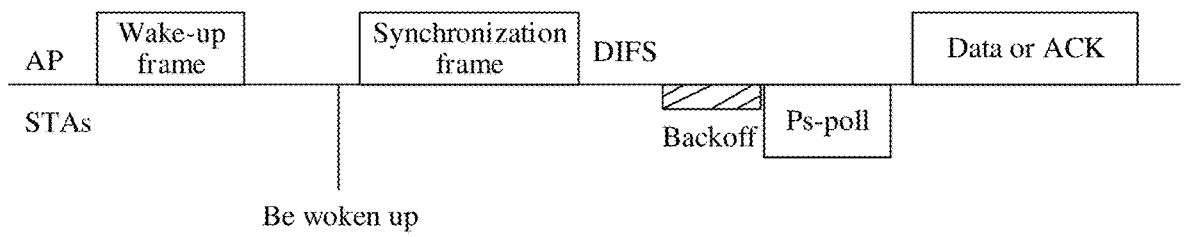
FIG. 8 is a schematic diagram of channel access in a multi-device wake-up scenario according to this application.

Optionally, in the multi-device wake-up scenario, when an implementation of the synchronization frame is (2) or (3), for a schematic diagram of accessing a channel by a woken-up second communications device, refer to FIG. 8.

(5) The first communications device may send, one by one when the channel is idle, a synchronization frame to the plurality of woken-up second communications devices, where the synchronization frame sent to each woken-up second communications device carries first indication information and an identifier of a corresponding woken-up second communications device. A simple example is used herein to briefly describe a process of "sending one by one".

It is assumed that there are stations A, B, C, and D. When an AP wakes up a plurality of stations, a wake-up frame sent by the AP includes identifiers of the four stations. It is assumed that the identifiers of the stations in the wake-up frame are sequentially an identifier of the station A, an identifier of the station B, an identifier of the station C, and an identifier of the station D. To be specific, A is a station that ranks the first, and B, C, and D are stations that rank the second, the third, and the fourth respectively. In addition, it is assumed that A, B, and C are stations that have a channel synchronization requirement (To be specific, before MRs go to sleep, the stations A, B, and C each send a channel synchronization request to the AP, to request the AP to assist the stations A, B, and C in quickly accessing a channel without waiting for a probe delay time), and D is a station that does not have a channel synchronization requirement.

During specific sending, the AP first sends a synchronization frame to the station A (or any specified station), and then the station A waits an SIFS time to return a wake-up report frame to the AP after receiving the synchronization frame. Next, the AP continues to send the synchronization frame to the station B, and the station B waits SIFS duration to return a wake-up report frame to the AP after receiving the synchronization frame. Then, the AP sends the synchronization frame to the station C, and the station C waits the SIFS duration to return a wake-up report frame to the AP after receiving the synchronization frame. In addition, because the station D does not send a channel synchronization request to the AP, the AP does not need to send a synchronization frame to the station D, and the station D needs to wait the probe delay time to preempt the channel to send a wake-up report frame.

In the case in which the first communications device sends the synchronization frames one by one, the synchronization frame may be any one of the L-Preamble, the CTS frame, the RTS frame, or the trigger frame.

In conclusion, regardless of the single-device wake-up scenario or the multi-device wake-up scenario, provided that the second communications device sends the channel synchronization request to the first communications device before the second communications device goes to sleep, the first communications device sends, when the channel is idle and with reference to the time at which the second communications device is woken up and that is learned by the first communications device, the synchronization frame to the woken-up second communications device to trigger the woken-up second communications device to access the channel without waiting for the probe delay time, thereby reducing a waiting time of the MR of the woken-up second communications device, and reducing power consumption of the second communications device. In addition, the first communications device sends the first synchronization frame to any one of the plurality of woken-up second communications devices, to trigger the plurality of second communications devices to access the channel without waiting for the probe delay time. This greatly reduces a transmission time of the synchronization frame, and also ensures that the plurality of woken-up second communications devices can quickly access the channel.

Figure 9:
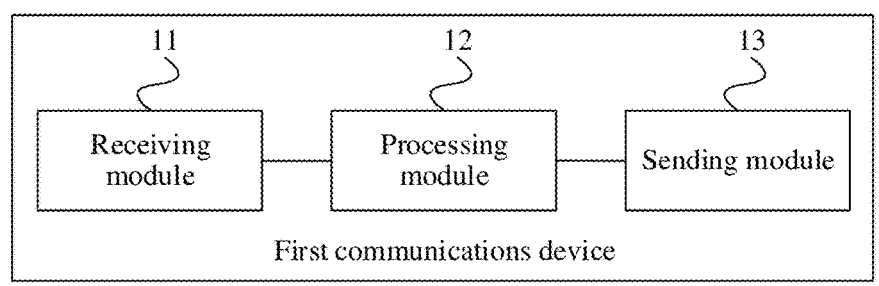
FIG. 9 is a schematic structural diagram of an embodiment of a channel access indication apparatus according to this application.

FIG. 9 is a schematic structural diagram of an embodiment of a channel access indication apparatus according to this application. The channel access indication apparatus may be integrated into the first communications device in the foregoing method embodiment, or may be the first communications device. The indication apparatus may be implemented by software, hardware, or a combination of software and hardware. As shown in FIG. 9, the apparatus includes a receiving module 11, a processing module 12, and a sending module 13.

The receiving module 11 is configured to receive a channel synchronization request sent by a second communications device, the channel synchronization request is used to request the first communications device to send a synchronization frame to the second communications device, and a wake-up receiver is configured for the second communications device.

The processing module 12 is configured to: according to the channel synchronization request and a time at which the second communications device is woken up and that is learned by the first communications device based on preset signaling, instruct the sending module 13 to send, when a channel is idle, the synchronization frame to the woken-up second communications device, and the synchronization frame is used to instruct the woken-up second communications device to access the channel after receiving the synchronization frame.

Optionally, if there are a plurality of woken-up second communications devices, the sending module 13 is specifically configured to send, when the channel is idle, a first synchronization frame to any one of the plurality of woken-up second communications devices, where the first synchronization frame carries an identifier of the any one woken-up second communications device; and the first synchronization frame is used to instruct the any one woken-up second communications device to wait first preset duration to access the channel after receiving the first synchronization frame. The first synchronization frame is any one of a clear-to-send CTS frame, a request-to-send RTS frame, or a trigger frame.

Optionally, if there are a plurality of woken-up second communications devices, the sending module 13 is specifically configured to send, when the channel is idle, a second synchronization frame to the plurality of woken-up second communications devices, where the second synchronization frame is used to instruct each woken-up second communications device to wait second preset duration to perform a backoff procedure to contend for access to the channel after receiving the second synchronization frame; and a receiver address of the second synchronization frame is a broadcast address. The second synchronization frame is any one of a CTS frame, an RTS frame, or a CF-end frame.

With reference to the foregoing two optional manners, the CTS frame may carry second indication information; and the second indication information is used to indicate, to the woken-up second communications device, that the CTS frame is a synchronization frame.

Optionally, if there are a plurality of woken-up second communications devices, the sending module 13 is specifically configured to send, when the channel is idle, a third synchronization frame to the plurality of woken-up second communications devices, where the third synchronization frame carries a sub-channel resource indication of each woken-up second communications device and an identifier of each woken-up second communications device; a receiver address of the third synchronization frame is a broadcast address; and the third synchronization frame is used to instruct the plurality of woken-up second communications devices to wait first preset duration to simultaneously access the channel based on their respective sub-channel resource indications after receiving the third synchronization frame. The third synchronization frame is any one of a multi-user CTS frame, a multi-user RTS frame, or a trigger frame.

Optionally, if there are a plurality of woken-up second communications devices, the sending module 13 is configured to send, when the channel is idle, a physical layer legacy preamble L-Preamble to the plurality of woken-up second communications devices, where the L-Preamble carries first indication information and all or a portion bits of a check code field of a wake-up frame that is received by wake-up receivers of the plurality of woken-up second communications devices to wake up main transceivers of the plurality of second communications devices; the first indication information is used to indicate, to the plurality of woken-up second communications devices, that the L-Preamble is a synchronization frame; the all or the portion bits of the check code field are used to indicate identifiers of the plurality of woken-up second communications devices; and the L-Preamble is used to instruct the plurality of woken-up second communications devices to wait second preset duration to perform a backoff procedure to contend for access to the channel after receiving the L-Preamble.

Optionally, if there is one woken-up second communications device, the synchronization frame is a physical layer legacy preamble L-Preamble, where the L-Preamble carries first indication information and all or a portion bits of a check code field of a wake-up frame received by a wake-up receiver of the woken-up second communications device; the first indication information is used to indicate, to the second communications device, that the L-Preamble is a synchronization frame; and the all or the portion bits of the check code field are used to indicate an identifier of the woken-up second communications device.

Optionally, if there is one woken-up second communications device, the synchronization frame is any one of a clear-to-send CTS frame, a request-to-send RTS frame, or a trigger frame, and the synchronization frame carries an identifier of the woken-up second communications device.

Optionally, the first preset duration is an SIFS period.

Optionally, the second preset duration is a DIFS.

Optionally, the receiving module 11 is specifically configured to receive an association request frame sent by the second communications device, where the association request frame carries indication information of the channel synchronization request of the second communications device.

Optionally, the receiving module 11 is specifically configured to receive a management frame or a control frame sent by the second communications device, where the management frame or the control frame carries indication information of the channel synchronization request.

The channel access indication apparatus provided in this application may execute the foregoing method embodiment. An implementation principle and a technical effect of the channel access indication apparatus are similar. Details are not described herein again.

Figure 10:
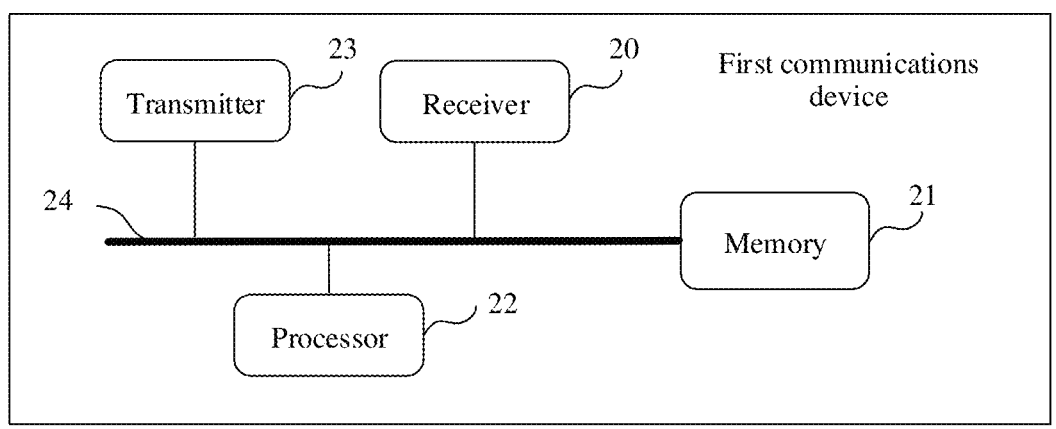
FIG. 10 is a schematic structural diagram of an embodiment of a channel access indication device according to this application.

FIG. 10 is a schematic structural diagram of an embodiment of a channel access indication device according to this application. The channel access indication device may be the first communications device in the foregoing method embodiment. As shown in FIG. 10, the first communications device includes a receiver 20, a memory 21, a processor 22, a transmitter 23, and at least one communications bus 24. The communications bus 24 is configured to implement a communication connection between elements. The memory 21 may include a high-speed RAM memory, or may include a nonvolatile memory NVM, for example, at least one magnetic disk memory. The memory 21 may store various programs, used to complete various processing functions and implement steps of the method in this embodiment.

Specifically, in this embodiment, the receiver 20 is configured to receive a channel synchronization request sent by a second communications device, the channel synchronization request is used to request the first communications device to send a synchronization frame to the second communications device, and a wake-up receiver is configured for the second communications device.

The processor 22 is configured to: according to the channel synchronization request and a time at which the second communications device is woken up and that is learned by the first communications device based on preset signaling, instruct the transmitter 23 to send, when a channel is idle, the synchronization frame to the woken-up second communications device, and the synchronization frame is used to instruct the woken-up second communications device to access the channel after receiving the synchronization frame.

Optionally, if there are a plurality of woken-up second communications devices, the transmitter 23 is specifically configured to send, when the channel is idle, a first synchronization frame to any one of the plurality of woken-up second communications devices, where the first synchronization frame carries an identifier of the any one woken-up second communications device; and the first synchronization frame is used to instruct the any one woken-up second communications device to wait first preset duration to access the channel after receiving the first synchronization frame. The first synchronization frame is any one of a clear-to-send CTS frame, a request-to-send RTS frame, or a trigger frame.

Optionally, if there are a plurality of woken-up second communications devices, the transmitter 23 is specifically configured to send, when the channel is idle, a second synchronization frame to the plurality of woken-up second communications devices, where the second synchronization frame is used to instruct each woken-up second communications device to wait second preset duration to perform a backoff procedure to contend for access to the channel after receiving the second synchronization frame; and a receiver address of the second synchronization frame is a broadcast address. The second synchronization frame is any one of a CTS frame, an RTS frame, or a CF-end frame.

With reference to the foregoing two optional manners, the CTS frame may carry second indication information; and the second indication information is used to indicate, to the woken-up second communications device, that the CTS frame is a synchronization frame.

Optionally, if there are a plurality of woken-up second communications devices, the transmitter 23 is specifically configured to send, when the channel is idle, a third synchronization frame to the plurality of woken-up second communications devices, where the third synchronization frame carries a sub-channel resource indication of each woken-up second communications device and an identifier of each woken-up second communications device; a receiver address of the third synchronization frame is a broadcast address; and the third synchronization frame is used to instruct the plurality of woken-up second communications devices to wait first preset duration to simultaneously access the channel based on their respective sub-channel resource indications after receiving the third synchronization frame. The third synchronization frame may be any one of a multi-user CTS frame, a multi-user RTS frame, or a trigger frame.

Optionally, if there are a plurality of woken-up second communications devices, the transmitter 23 is configured to send, when the channel is idle, a physical layer legacy preamble L-Preamble to the plurality of woken-up second communications devices, where the L-Preamble carries first indication information and all or a portion bits of a check code field of a wake-up frame that is received by wake-up receivers of the plurality of woken-up second communications devices to wake up main transceivers of the plurality of second communications devices; the first indication information is used to indicate, to the plurality of woken-up second communications devices, that the L-Preamble is a synchronization frame; the all or the portion bits of the check code field are used to indicate identifiers of the plurality of woken-up second communications devices; and the L-Preamble is used to instruct the plurality of woken-up second communications devices to wait second preset duration to perform a backoff procedure to contend for access to the channel after receiving the L-Preamble.

Optionally, if there is one woken-up second communications device, the synchronization frame is a physical layer legacy preamble L-Preamble, where the L-Preamble carries first indication information and all or a portion bits of a check code field of a wake-up frame received by a wake-up receiver of the woken-up second communications device; the first indication information is used to indicate, to the second communications device, that the L-Preamble is a synchronization frame; and the all or the portion bits of the check code field are used to indicate an identifier of the woken-up second communications device.

Optionally, if there is one woken-up second communications device, the synchronization frame is any one of a clear-to-send CTS frame, a request-to-send RTS frame, or a trigger frame, and the synchronization frame carries an identifier of the woken-up second communications device.

Optionally, the first preset duration is an SIFS period.

Optionally, the second preset duration is a DIFS.

Optionally, the receiver 20 is specifically configured to receive an association request frame sent by the second communications device, where the association request frame carries indication information of the channel synchronization request of the second communications device.

Optionally, the receiver 20 is specifically configured to receive a management frame or a control frame sent by the second communications device, where the management frame or the control frame carries indication information of the channel synchronization request.

The channel access indication device provided in this application may execute the foregoing method embodiment. An implementation principle and a technical effect of the channel access indication device are similar. Details are not described herein again.

Methods or algorithm steps described with reference to the content disclosed in this application may be implemented by hardware, or may be implemented by a processor by executing a software instruction, or may be implemented by using a computer program product. The software instruction may include a corresponding software module. The software module may be located in a RAM memory, a flash memory, a ROM memory, an EPROM memory, an EEPROM memory, a register, a hard disk, a removable hard disk, a CD-ROM, or a storage medium of any other form well-known in the art. For example, a storage medium is coupled to the processor, so that the processor can read information from the storage medium, and write information into the storage medium. Certainly, the storage medium may alternatively be a component of the processor. The processor and the storage medium may be located in an ASIC. In addition, the ASIC may be located in user equipment. Certainly, the processor and the storage medium may exist in the user equipment as discrete components.

A person skilled in the art should be aware that in the foregoing one or more examples, the functions described in this application may be implemented by hardware, software, firmware, or any combination thereof. When the functions are implemented by software, the functions may be stored in a computer-readable medium or transmitted as one or more instructions or code in a computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

In the several embodiments provided in this application, it should be understood that the disclosed system, device, and method may be implemented in other manners without departing from the scope of this application. For example, the embodiments described above are merely examples. For example, division of the modules or units is merely logical function division, and there may be another division manner in actual implementation. For example, a plurality of units or components may be combined or integrated into another system, or some features may be ignored or not performed. The units described as separate parts may or may not be physically separate, and parts displayed as units may or may not be physical units, and may be located in one position, or may be distributed on a plurality of network units. Some or all of the modules may be selected based on an actual requirement to achieve the objectives of the solutions of the embodiments.

In addition, the described system, device, and method, and schematic diagrams of different embodiments may be combined or integrated with other systems, modules, technologies, or methods without departing from the scope of this application. In addition, the displayed or discussed mutual couplings or direct couplings or communication connections may be implemented by using some interfaces. The indirect couplings or communication connections between the apparatuses or units may be implemented in electronic, mechanical, or another form.

What is claimed is:

1. A channel access indication method, comprising:
    receiving, by a first communications device, a channel synchronization request sent by a second communications device, wherein a wake-up receiver is configured for the second communications device;
    according to the channel synchronization request and based on a time at which the second communications device is woken up, sending, by the first communications device when a channel is idle and to the woken-up second communications device, a first synchronization frame (a) including an identifier of the woken-up second communications device and (b) instructing the woken-up second communications device to access the channel after receiving the first synchronization frame; and
    broadcasting to a plurality of woken-up second communications devices, a second synchronization frame including a broadcast address when the channel is idle.

2. The method according to claim 1, wherein instructing the woken-up second communications device to access the channel after receiving the first synchronization frame comprises instructing the woken-up second communications device to wait a first preset duration to access the channel after receiving the first synchronization frame.

3. The method according to claim 2, wherein the first synchronization frame is any one of a clear-to-send CTS frame, a request-to-send RTS frame, or a trigger frame.

4. The method according to claim 1, wherein the second synchronization frame is used to instruct each of the plurality of woken-up second communications device to wait second preset duration to perform a backoff procedure to contend for access to the channel after receiving the second synchronization frame.

5. The method according to claim 1, further comprising:
    sending, by the first communications device when the channel is idle, a third synchronization frame to the plurality of woken-up second communications devices, wherein the third synchronization frame carries (a) a sub-channel resource indication of each woken-up second communications device, (b) an identifier of each woken-up second communications device, and (c) a broadcast address as a receiver address of the third synchronization frame,
    wherein the third synchronization frame is used to instruct the plurality of woken-up second communications devices to wait a first preset duration to simultaneously access the channel based on their respective sub-channel resource indications after receiving the third synchronization frame.

6. The method according to claim 1, further comprising:
    sending, by the first communications device when the channel is idle, a physical layer legacy preamble (L-Preamble) to the plurality of woken-up second communications devices, wherein the L-Preamble carries first indication information and all or a portion of bits of a check code field of a wake-up frame that is received by wake-up receivers of the plurality of woken-up second communications devices to wake up main transceivers of the plurality of woken-up second communications devices,
    wherein the first indication information is used to indicate, to the plurality of woken-up second communications devices, that the L-Preamble is a synchronization frame,
    wherein the all or the portion of the bits of the check code field are used to indicate identifiers of the plurality of woken-up second communications devices, and
    wherein the L-Preamble is used to instruct the plurality of woken-up second communications devices to wait a second preset duration to perform a backoff procedure to contend for access to the channel after receiving the L-Preamble.

7. The method according to claim 1, wherein the first synchronization frame is a physical layer legacy preamble (L-Preamble), wherein the L-Preamble carries first indication information and all or a portion of bits of a check code field of a wake-up frame received by a wake-up receiver of the woken-up second communications device are used to indicate, to the second communications device, that the L-Preamble is a synchronization frame, and
    wherein the all or the portion of the bits of the check code field are used to indicate an identifier of the woken-up second communications device.

8. The method according to claim 1, wherein the first synchronization frame is any one of a clear-to-send CTS frame, a request-to-send RTS frame, or a trigger frame.

9. The method according to claim 1, wherein the receiving, by the first communications device, the channel synchronization request comprises:

receiving, by the first communications device, an association request frame sent by the second communications device.

10. The method according to claim 1, wherein the receiving, by the first communications device, the channel synchronization request comprises:
receiving, by the first communications device, a management frame or a control frame sent by the second communications device or a control frame sent by the second communications device.

11. A channel access indication device, wherein the device is a first communications device, comprising:
a receiver configured to receive a channel synchronization request sent by a second communications device,
a processor, and
a transmitter,
wherein a wake-up receiver is configured for the second communications device,
wherein the processor is configured to, according to the channel synchronization request and based on a time at which the second communications device is woken up, instruct the transmitter to send, when a channel is idle and to the woken-up second communications device, a first synchronization frame (a) including an identifier of the woken-up second communications device and (b) instructing the woken-up second communications device to access the channel after receiving the first synchronization frame, and
wherein the processor is further configured to instruct the transmitter to broadcast to a plurality of woken-up second communications devices, a second synchronization frame including a broadcast address when the channel is idle.

12. The device according to claim 11, wherein the first synchronization frame is used to instruct the woken-up second communications device to wait a first preset duration to access the channel after receiving the first synchronization frame.

13. The device according to claim 11, wherein the second synchronization frame is used to instruct each of the plurality of woken-up second communications device to wait a second preset duration to perform a backoff procedure to contend for access to the channel after receiving the second synchronization frame.

14. The device according to claim 11, wherein the transmitter is configured to send, when the channel is idle, a third synchronization frame to the plurality of woken-up second communications devices, wherein the third synchronization frame carries (a) a sub-channel resource indication of each woken-up second communications device, (b) an identifier of each woken-up second communications device, and (c) a broadcast address as a receiver address of the third synchronization frame,
wherein the third synchronization frame is used to instruct the plurality of woken-up second communications devices to wait a first preset duration to simultaneously access the channel based on their respective sub-channel resource indications after receiving the third synchronization frame.

15. The device according to claim 11, wherein the transmitter is further configured to send, when the channel is idle, a physical layer legacy preamble (L-Preamble) to the plurality of woken-up second communications devices, wherein the L-Preamble carries first indication information and all or a portion of bits of a check code field of a wake-up frame that is received by wake-up receivers of the plurality of woken-up second communications devices to wake up main transceivers of the plurality of woken-up second communications devices,
wherein the first indication information is used to indicate, to the plurality of woken-up second communications devices, that the L-Preamble is a synchronization frame,
wherein the all or the portion bits of the check code field are used to indicate identifiers of the plurality of woken-up second communications devices, and
wherein the L-Preamble is used to instruct the plurality of woken-up second communications devices to wait a second preset duration to perform a backoff procedure to contend for access to the channel after receiving the L-Preamble.

16. The device according to claim 11, wherein the first synchronization frame is a physical layer legacy preamble (L-Preamble) wherein the L-Preamble carries first indication information and all or a portion of bits of a check code field of a wake-up frame received by a wake-up receiver of the woken-up second communications device are used to indicate, to the second communications device, that the L-Preamble is a synchronization frame, and
wherein the all or the portion of the bits of the check code field are used to indicate an identifier of the woken-up second communications device.

17. The device according to claim 11, wherein the first synchronization frame is any one of a clear-to-send CTS frame, a request-to-send RTS frame, or a trigger frame.

18. The device according to claim 11, wherein the first synchronization frame is any one of a clear-to-send CTS frame, a request-to-send RTS frame, or a trigger frame.

19. The device according to claim 11, wherein the receiver is configured to receive an association request frame sent by the second communications device, and the association request frame carries indication information of the channel synchronization request of the second communications device.

20. The device according to claim 11, wherein the receiver is configured to receive a management frame or a control frame sent by the second communications device, and the management frame or the control frame carries indication information of the channel synchronization request.

* * * * *